(12) United States Patent
Spina

(10) Patent No.: US 11,114,805 B2
(45) Date of Patent: Sep. 7, 2021

(54) MARINE SHORE POWER COMPONENT

(71) Applicant: Dominic R. Spina, Hasbrouck Heights, NJ (US)

(72) Inventor: Dominic R. Spina, Hasbrouck Heights, NJ (US)

(*) Notice: Subject to any disclaimer, the term of this patent is extended or adjusted under 35 U.S.C. 154(b) by 179 days.

(21) Appl. No.: 16/150,495

(22) Filed: Oct. 3, 2018

(65) Prior Publication Data

US 2019/0103714 A1 Apr. 4, 2019

Related U.S. Application Data

(60) Provisional application No. 62/567,612, filed on Oct. 3, 2017.

(51) Int. Cl.
*H01R 13/66* (2006.01)
*H01R 31/06* (2006.01)
(Continued)

(52) U.S. Cl.
CPC ....... *H01R 13/6666* (2013.01); *H01R 31/065* (2013.01); *B60L 3/0046* (2013.01);
(Continued)

(58) Field of Classification Search
CPC .............. H01R 13/6666; H01R 31/065; H01R 13/625; H01R 43/26; H01R 31/06;
(Continued)

(56) References Cited

U.S. PATENT DOCUMENTS 5,053,634 A * 10/1991 Kakinuma ............. H05K 5/068
307/9.1
8,884,773 B2 11/2014 Wiesemann et al.
(Continued)

FOREIGN PATENT DOCUMENTS

GB 2539894 A 1/2017
WO 2017102400 A1 6/2017

OTHER PUBLICATIONS

"Hubbell Wiring Device-Kellems Line Crd . . . 30A, NEMA 4 X, 250V GFP5305_Zoro", https://www.zoro.com/hubbell-wiring-device-kellems-line-crd-gfci-6-ft-ylw-30a-nema-4x-250v-gfp5305/i/G1253725/, Aug. 9, 2017, 2 pages.
(Continued)

*Primary Examiner* — Gary L Laxton
(74) *Attorney, Agent, or Firm* — John G. Posa; Belzer PC

(57) ABSTRACT

A shore power cord is provided. The shore power cord includes a connector plug rated at a first amperage, wherein the connector plug is configured to connect to an electrical power source, and a connector receptacle rated at a second amperage, wherein the connector receptacle is configured to connect to an electrical power receiver, and wherein the connector plug and the connector receptacle are electrically coupled via at least one electrically conductive line. The shore power cord further includes an overcurrent protection apparatus, wherein the overcurrent protection apparatus is positioned along the at least one line, between the connector plug and the connector receptacle, and wherein the overcurrent protection apparatus includes at least one circuit breaker, the at least one circuit breaker having an amperage, the amperage of the at least one circuit breaker being a lower of the first amperage and the second amperage.

11 Claims, 6 Drawing Sheets

(51) Int. Cl.
*H01R 13/625* (2006.01)
*B60L 3/00* (2019.01)
*H01R 43/26* (2006.01)

(52) U.S. Cl.
CPC ......... *B60L 3/0069* (2013.01); *B60L 2200/32* (2013.01); *H01R 13/625* (2013.01); *H01R 43/26* (2013.01)

(58) Field of Classification Search
CPC ..... H01R 13/66; B60L 3/0046; B60L 3/0069; B60L 2200/32
See application file for complete search history.

(56) References Cited

U.S. PATENT DOCUMENTS

| | | | |
|---|---|---|---|
| 8,971,083 B1* | 3/2015 | Johnson | H02M 5/14 363/142 |
| 9,365,936 B2 | 6/2016 | de Pierola | |
| 9,463,696 B2 | 10/2016 | Teichmann | |
| 9,762,012 B1* | 9/2017 | LeGros, Jr. | H01R 31/02 |
| 2009/0160427 A1* | 6/2009 | Drake | G01R 19/16566 324/72 |
| 2010/0141038 A1* | 6/2010 | Chapel | H01R 25/003 307/64 |
| 2012/0286729 A1* | 11/2012 | Yegin | B60L 3/04 320/109 |

OTHER PUBLICATIONS

"Power First Line Cord GFCI, 2 ft., Ylw, 15A, 5-15F, 125V 11X-428 _ Zoro", https://www.zoro.com/power-first-line-cord-gfci-2-ft-ylw-15a-5-15p-125v-11x428/i/G4712766/, Aug. 9, 2017, 3 pages.
"Southwire Company Line Cord GFCI, 2 ft . . . A, L5-30P, 120V 44700 004-3 _ Zoro", https://www.zoro.com/southwire-company-line-cord-gfci-2-ft-ylw-30a-15-30p-120v-44700-004-3/i/G4001155/, Aug. 9, 2017, 4 pages.

* cited by examiner

MARINE SHORE POWER COMPONENT

CLAIM OF PRIORITY

This application is a United States non-provisional application and claims priority to U.S. Provisional Patent Application No. 62/567,612, filed Oct. 3, 2017, herein incorporated by reference in its entirety.

FIELD OF THE EMBODIMENTS

This invention relates to power supply components and, in particular, to marine shore power components configured to protect from overcurrent.

BACKGROUND OF THE EMBODIMENTS

Many marine vessels are supplied power through a marine shore power cord. Marine shore power cords receive electricity from a shore-bound power source and deliver the electricity to the marine vessel, thus supplying the marine vessel with power. As with all power transfer cords, problems can occur, such as overcurrent occurring. An overcurrent in a marine shore power cord would present itself when the current passing through the marine shore power cord exceeds the rating of the marine shore power cord equipment. Such an overcurrent can result from faults such as a ground fault, a power overload, and/or a short circuit.

Overcurrents, short circuits, and other power cord issues may lead to sparking, fires, and damage to electronic devices from improper current being applied to one or more devices, which may result in injury, death, and/or damage to property. Since many marine shore power cords are in use near water, the risk of electrocution in the event of a fault may also occur. A marine shore power cord that is configured to aid in the prevention of these faults in marine shore power cords could thus aid in the prevention of injury, death, and/or damage to property.

A means of protecting against overcurrent in marine shore power cords while still having the marine shore power cords be National Electric Code (NEC) compliant is thus needed.

Examples of related art are described below:

U.S. Pat. No. 8,884,773 pertains to a shore power cord that includes a power supply connector electrically connected to a vehicle connector. In some cases, the vehicle connector includes features to selectively secure the vehicle connector to a vehicle power receptacle inlet. In some cases, the shore power cord includes a test module that evaluates the condition of the cord set and a power supply when the cord set is connected to the power supply.

U.S. Pat. No. 9,365,936 pertains to semi-circuit systems, methods and apparatus for the protection of metallic elements immersed in an electrolytic fluid against electrochemical corrosion. The apparatus preferably comprises four components: a housing component, an anode component, an electrically conductive cord component, and electrical connector component. In preferred handheld examples, the housing component is positively buoyant, featuring impact and water resistant materials, partially encapsulating the anode, thereby protecting nearby structures from impact damage, while shielding the anode component from sunlight, thereby reducing the rate of marine growth thereon.

U.S. Pat. No. 9,463,696 pertains to systems and methods for a mobile power conditioning platform. According to one embodiment of the invention, a mobile power conditioning platform is positioned proximate to a power grid, coupled to the power grid via an offboard power coupling, coupled to an onboard electrical system of a vehicle via a vehicle power coupling, and transfers electric power between the power grid and the onboard electrical system. One or more onboard generators of the vehicle may modify operation at least partly in response to the transfer of electric power.

International Patent Publication No. WO2017102400A1 pertains to a marine vessel electric power supply charging control system that comprises one or more energy storage control units, one or more energy storage devices coupled to the one or more energy storage control units; and at least one consumer on board the vessel. The charging control system further comprises a DC input to receive a DC input voltage on a DC bus from a shore DC supply; wherein the energy storage control unit comprises an input to receive a DC input voltage from the DC bus, a voltage detector to determine a DC voltage at an input to the energy storage device; a converter to convert the DC input voltage to a required output voltage according to the DC voltage detected at the input to the energy storage device; and, an output to output the required DC output voltage to an energy storage device.

None of the art described above addresses all of the issues that the present invention does.

SUMMARY OF THE EMBODIMENTS

According to an aspect of the present invention, a shore power cord is provided. The shore power cord includes a connector plug rated at a first amperage, wherein the connector plug is configured to connect to an electrical power source, and a connector receptacle rated at a second amperage, wherein the connector receptacle is configured to connect to an electrical power receiver, and wherein the connector plug and the connector receptacle are electrically coupled via at least one electrically conductive line. The shore power cord further includes an overcurrent protection apparatus, wherein the overcurrent protection apparatus is positioned along the at least one line, between the connector plug and the connector receptacle, and wherein the overcurrent protection apparatus includes at least one circuit breaker, the at least one circuit breaker having an amperage, the amperage of the at least one circuit breaker being a lower of the first amperage and the second amperage.

According to another aspect of the present invention, an overcurrent protection adaptor is provided. The overcurrent protection adaptor includes an outer housing, a first connector configured to receive a first electrically conductive line, the first electrically conductive line being coupled to a connector plug rated at a first amperage, wherein the connector plug is configured to connect to an electrical power source, and a second connector configured to receive a second electrically conductive line, the second electrically conductive line being coupled to a connector receptacle rated at a second amperage, wherein the connector receptacle is configured to connect to an electrical power receiver. The overcurrent protection adaptor further includes at least one circuit breaker having an amperage, the amperage of the at least one circuit breaker being a lower of the first amperage and the second amperage.

It is an object of the present invention to provide the shore power cord, wherein the at least one circuit breaker includes at least one waterproof circuit breaker.

It is an object of the present invention to provide the shore power cord, wherein the first amperage is greater than the second amperage.

It is an object of the present invention to provide the shore power cord, wherein the at least one electrically conductive line includes a service, thermoplastic jacket, oil resistant jacket, and weather resistant cord.

It is an object of the present invention to provide the shore power cord, wherein the shore power cord further includes at least one second connector receptacle coupled to the connector plug via the at least one electrically conductive line.

It is an object of the present invention to provide the shore power cord, wherein the at least one second power receptacle has a third amperage.

It is an object of the present invention to provide the shore power cord, wherein the amperage of the at least one circuit breaker is a lower of the first amperage, the second amperage, and the third amperage.

It is an object of the present invention to provide the shore power cord, wherein the at least one electrically conductive line extends outwardly from the overcurrent protection apparatus.

It is an object of the present invention to provide the overcurrent protection adaptor, wherein the at least one circuit breaker includes at least one waterproof circuit breaker.

It is an object of the present invention to provide the overcurrent protection adaptor, wherein the first amperage is greater than the second amperage.

It is an object of the present invention to provide the overcurrent protection adaptor, wherein the first electrically conductive line and the second electrically conductive line include a service, thermoplastic jacket, oil resistant jacket, and weather resistant cord.

It is an object of the present invention to provide the overcurrent protection adaptor, wherein the overcurrent protection adaptor further includes at least one third connector configured to receive a third electrically conductive line, the third electrically conductive line being coupled to a connector receptacle rated at a third amperage, wherein the connector receptacle is configured to connect to an electrical power receiver.

It is an object of the present invention to provide the overcurrent protection adaptor, wherein the amperage of the at least one circuit breaker is a lower of the first amperage, the second amperage, and the third amperage.

DESCRIPTION OF THE PREFERRED EMBODIMENTS

Figure 1:
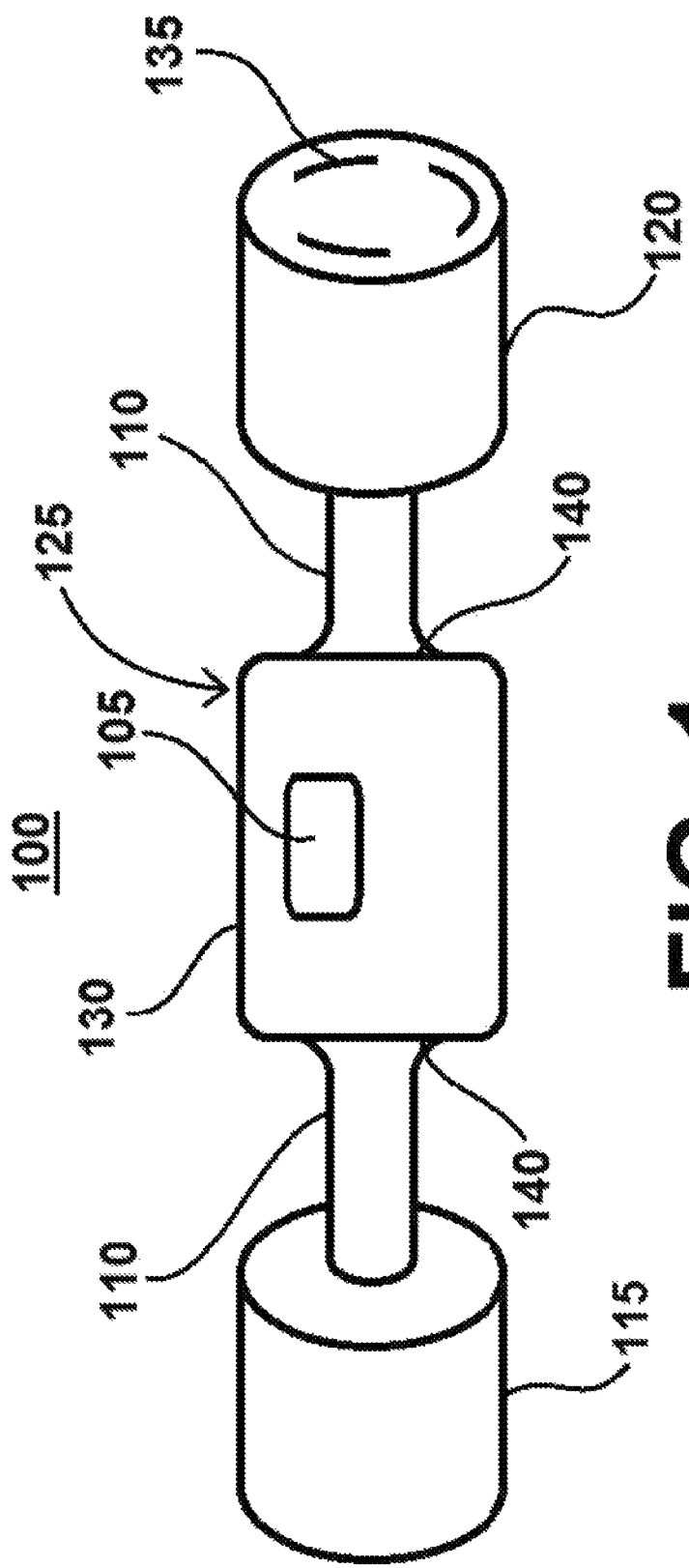
FIG. 1 shows a perspective view of a marine shore power cord, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention describes shore power cords, according to various embodiments of the present invention, that are National Electric Code (NEC) compliant and that include one or more overcurrent shore power cord adaptors.

Figure 2:
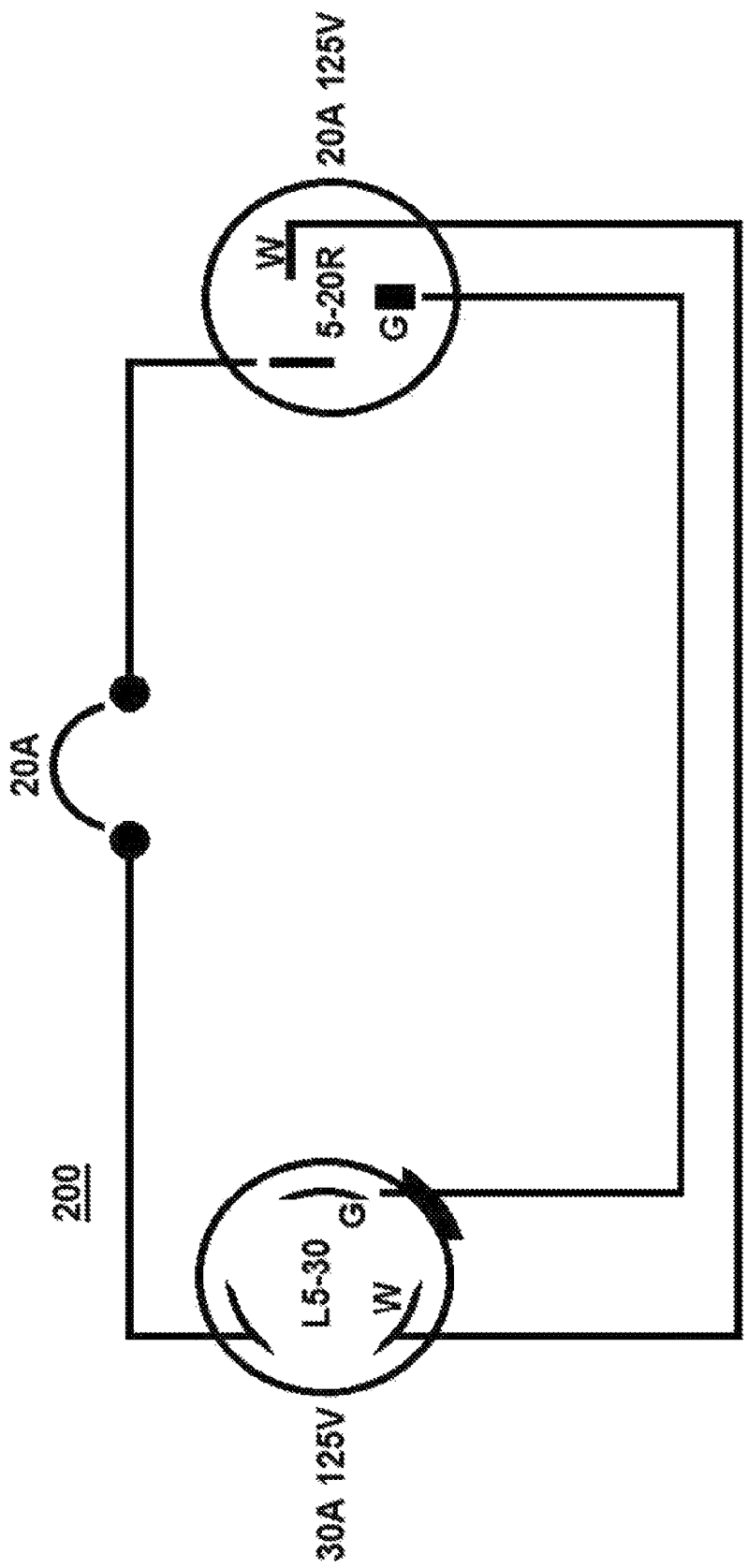
FIG. 2 shows an electrical diagram of the marine shore power cord as shown in FIG. 1, according to an embodiment of the present invention.

Referring now to FIG. 1, a marine shore power cord 100 is illustratively depicted, in accordance with an embodiment of the present invention. FIG. 2 shows an electrical diagram 200 of the marine shore power cord 100 as shown in FIG. 1.

According to an embodiment, the marine shore power cord 100 includes a waterproof circuit breaker 105. According to an embodiment, the waterproof circuit breaker 105 is installed to the lowest rated amperage of one or more connector plugs 115 and one or more connector receptacles 120. For example, going from a 30 amp connector plug 115 to a 20 amp connector receptacle 120, the breaker 105 would be sized for a 20 amp connection, which would make the whole assembly National Electrical Code (NEC) compliant and safer than current adaptor cords on the market, aiding in the prevention of electrical fires, damage to property, injury, and/or death.

Figure 3:
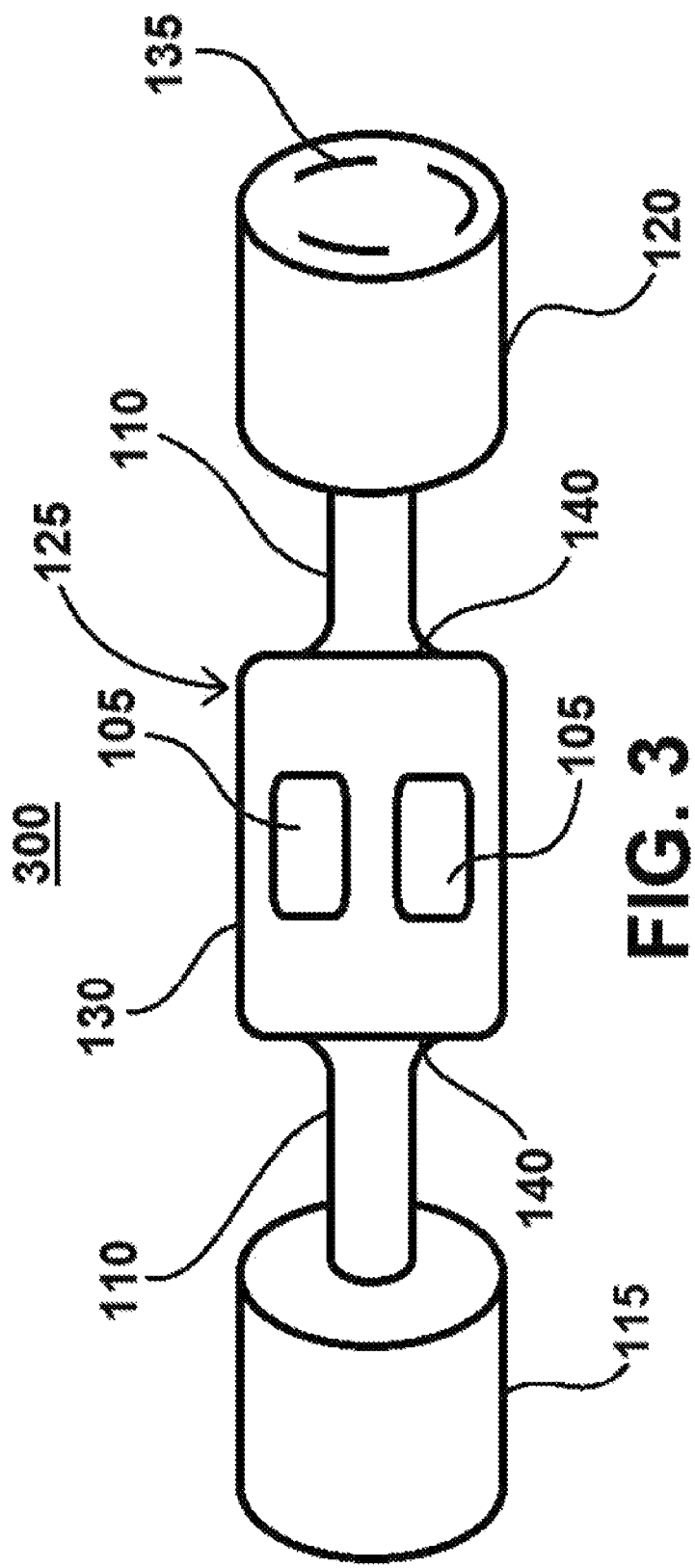
FIG. 3 shows a perspective view of a marine shore power cord, according to a second embodiment of the present invention.
Figure 5:
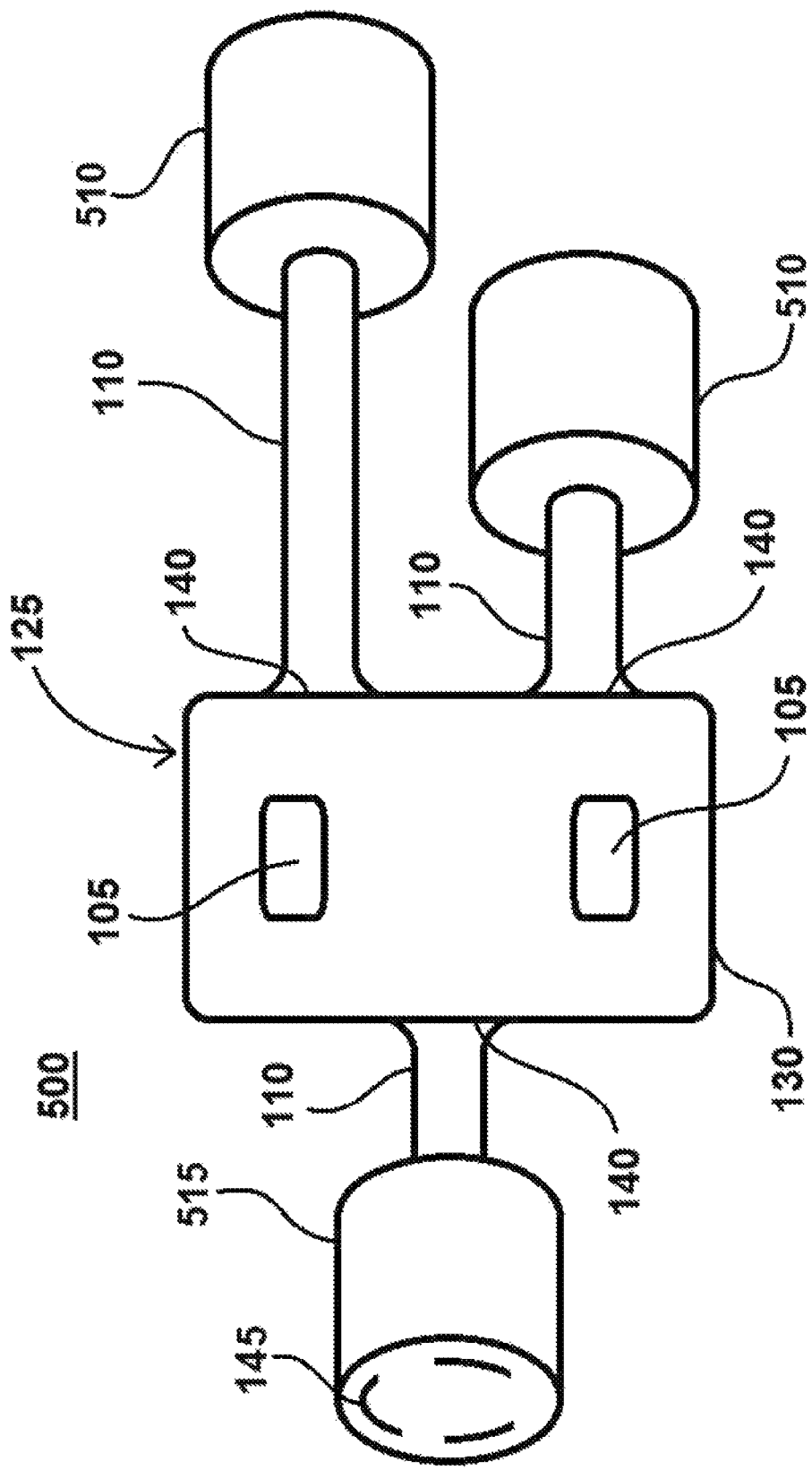
FIG. 5 shows a perspective view of a marine shore power cord, according to a third embodiment of the present invention.

According to the embodiment shown in FIG. 1, the shore power cord 100 includes a 30 amp connector plug 115 extending outwardly from a circuit breaker 105 and being electrically coupled to the circuit breaker 105 via an electrically conductive line 110, and a 20 amp connector receptacle 120 extending outwardly from the circuit breaker 105 and being electrically coupled to the circuit breaker 105 via an electrically conductive line 110. The connector plug 115 is configured to connect to an electrical power source and the connector receptacle 120 is configured to connect to an electrical power receiver. According to an embodiment, the connector receptacle 120 includes one or more receivers 135 for electrically coupling the connector receptacle 120 to the electrical power receiver. According to an embodiment, the connector plug 115 includes one or more prongs (or other connective material) 145 (as shown in FIG. 5) for electrically coupling the connector plug 115 to the electrical power source. The one or more receivers 135 and/or one or more prongs 145 may be configured to couple to any suitable electrical power receivers and/or electrical power sources. According to an embodiment, the shore power cord 100 (as well as shore power cords 300 and 500, as shown in FIGS. 3 and 5) include any suitable combination of connector plugs 115, 515 and/or connector receptacles 120, 510.

It is noted that the electrically conductive line 110 may be a single electrically conductive line 110 extending from the connector plug 115 to the connector receptacle 120 and/or multiple electrically conductive lines 110 connected via an overcurrent device 125 housing the circuit breaker 105.

When going from a 30 amp plug 115 down to a 20 amp receptacle 120, the device 100 and/or or electrically conductive line 110 would be protected at 20 amps because the circuit breaker 105 would trip when an excess of 20 amps was reached over a predetermined length of time. According to an embodiment, the circuit breaker 105 may be housed within an overcurrent device 125. The overcurrent device 125 may be integrally incorporated into the shore power cord 100 and/or may be an adaptor configured for use with other shore power cords 100. According to an embodiment, the 30 amp connector plug 115 measures at 125 volts and the 20 amp connector receptacle 120 measures at 125 volts. It is noted, however, that other voltages may also be used while still maintaining the spirit of the present invention.

According to an embodiment, one or more lines 110 connect, via one or more connectors 140, to the overcurrent device 125, extending laterally from the overcurrent device 125. According to an embodiment, the overcurrent device 125 includes an outer housing 130, the outer housing 130 being configured to house the at least one circuit breakers 105 and the one or more connectors 140.

For example, using a 50 amp connector plug 115 having an electrically conductive line 110 passing through a waterproof 30 amp circuit breaker 105 and ending in a 50 amp conductive receptacle 120, which an existing 50 amp to twin 30 amp adaptor cord could be plugged into, makes the shore power feed overcurrent compliant with NEC standards pertaining to circuit breakers and overcurrent protection devices.

Figure 4:
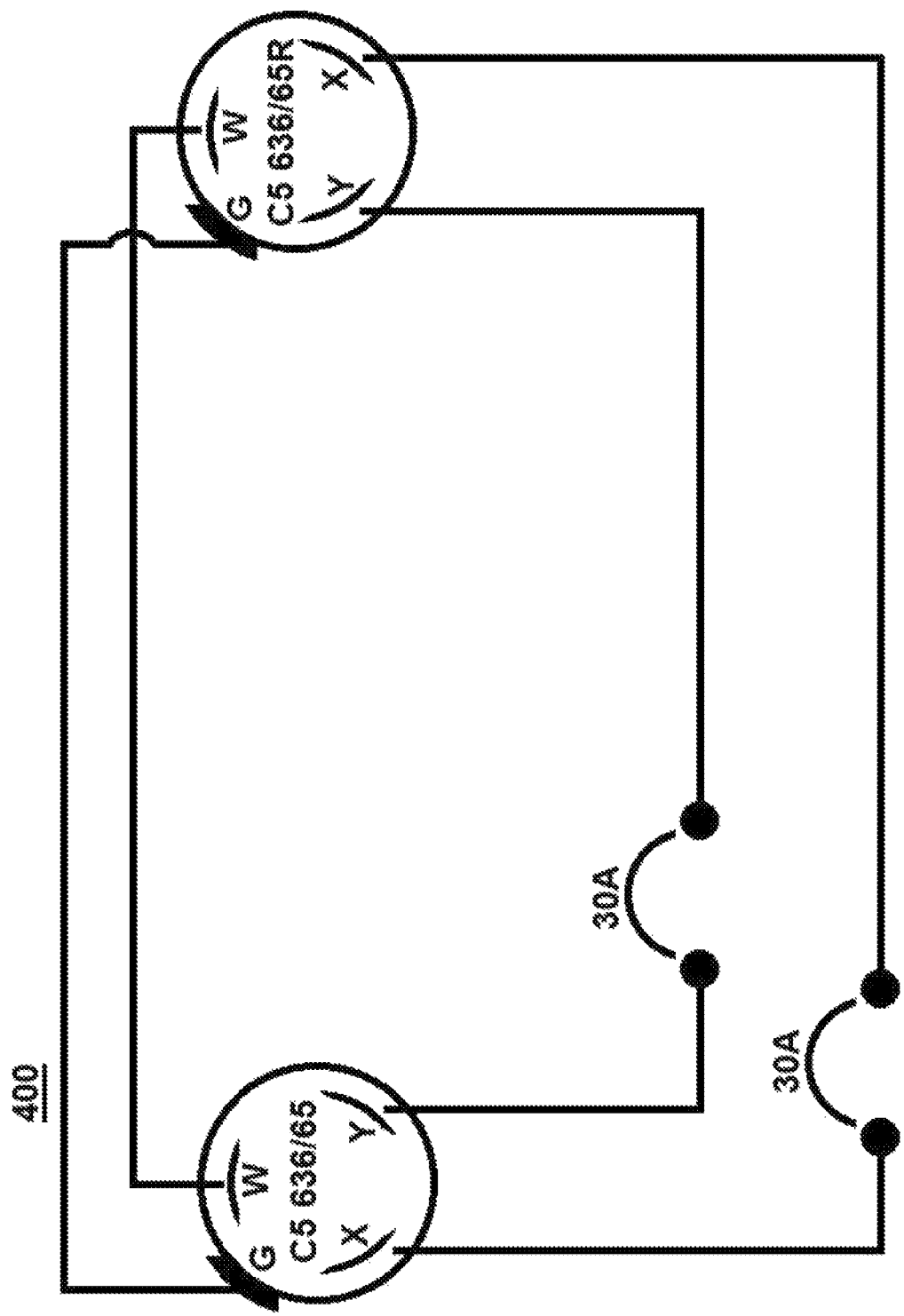
FIG. 4 shows an electrical diagram of the marine shore power cord as shown in FIG. 3, according to an embodiment of the present invention.

Referring now to FIG. 3, a marine shore power cord 300 is illustratively depicted, in accordance with an embodiment of the present invention. FIG. 4 shows an electrical diagram 400 of the marine shore power cord 300 as shown in FIG. 3.

According to the embodiment shown in FIG. 3, the marine shore power cord 300 includes two waterproof circuit breakers 105. It is noted, however, that any suitable number of waterproof circuit breakers 105 may be used while maintaining the spirit of the present invention. According to an embodiment, each of the two waterproof circuit breakers 105 is installed to 30 amps. However, depending on the equipment, any suitable amperage may be used. According to an embodiment, the overcurrent device 125 shown in FIG. 3 may be assembled as an adaptor without electrically conductive line 110 protruding from the overcurrent device 125. According to an embodiment of the device shown in FIG. 3, the device 300 is overcurrent protected at 30 amps and may include a connector plug 115, two waterproof circuit breakers 105, a connector receptacle 120, and one or more electrically conductive lines 110.

Figure 6:
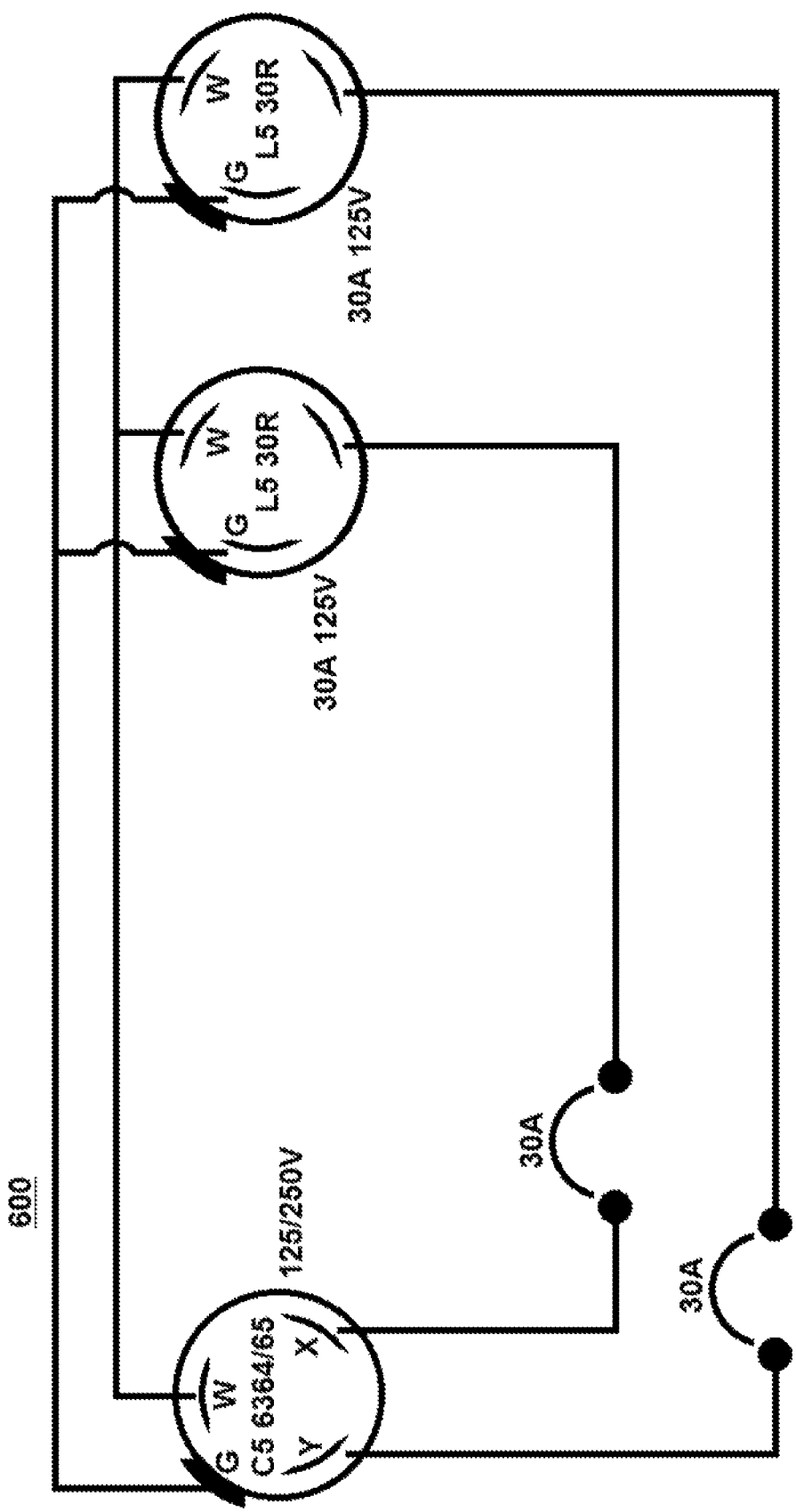
FIG. 6 shows an electrical diagram of the marine shore power cord as shown in FIG. 5, according to an embodiment of the present invention.

Referring now to FIG. 5, a marine shore power cord 500 is illustratively depicted, in accordance with an embodiment of the present invention. FIG. 6 shows an electrical diagram 600 of the marine shore power cord 500 as shown in FIG. 5.

According to the embodiment as shown in FIG. 5, extending outwardly from the overcurrent device 125 are two 30 amp connector receptacles 510 and one connector plug 515. It is noted, however, that any suitable amperage for any of the connector plug 515 and/or connector receptacles 510 may be used, while maintaining the spirit of the present invention.

According to an embodiment, the electrically conductive lines 110 in any of the shore power cords 100, 300, 500 may include a service, thermoplastic jacket, oil resistant jacket, weather resistant (STOW) cord 110. According to an embodiment, the electrically conductive lines 110 may include copper, aluminum, and/or any other suitable conductive materials. According to an embodiment, the electrically conductive lines 110 include conduit. It is noted, however, that other suitable electrically conductive lines 110 may also be implemented in accordance with various embodiments of the present invention, while still maintaining the spirit of the present invention.

According to an embodiment, a ground fault circuit interrupter (GFCI) device may be added to any of the shore power cords 100, 300, 500 in order to achieve increased safety, the GFCI device being configured to shut off any electric power circuits in the event that current flowing along an unintended path is detected. According to an embodiment, a GFCI device could also be included as part of the shore power cord 100, 300, 500. According to other embodiments, other circuit interrupters may also be incorporated into any of the shore power cords 100, 300, 500 including, but not limited to, arc-fault circuit interrupters, combination arc-fault circuit interrupters, etc.

According to an embodiment, the shore power cord 100, 300, 500 is composed of multiple separable materials. According to an embodiment, the shore power cord 100, 300, 500 is formed as a singular water tight molded assembly. The water tight molded assembly may include, e.g., rubber, plastic, and/or any other suitable material while maintaining the spirit of the present invention.

According to an embodiment, the shore power cords 100, 300, 500 heretofore described are used in conjunction with marine technology such as, e.g., boats. It is noted, however, that the present invention may be used with other types of technologies (e.g., recreational vehicles, motor homes, etc.) while still maintaining the spirit of the present invention.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A shore power cord, comprising:
   a single connector plug configured to connect to an electrical power source, and wherein the single connector plug is rated at a first amperage;
   a connector receptacle configured to connect to an electrical power receiver, and wherein the connector receptacle is rated at a second amperage;
   wherein the connector plug and the connector receptacle are electrically coupled via a plurality of electrically conductive lines including at least one electrically hot "hot" line;
   a circuit breaker positioned along the at least one electrically hot line between the connector plug and the connector receptacle;
   wherein the at least one electrically hot line from the connector plug makes a direct electrical connection to the circuit breaker, and the at least one electrically hot line from the circuit breaker makes a direct electrical connection to the connector receptacle; and
   wherein the circuit breaker has an amperage rating that corresponds to the second amperage rating of the connector receptacle, such that if the electrical current at the connector receptacle exceeds the second amperage, the circuit breaker trips.

2. The shore power cord as recited in claim 1, wherein the at least one circuit breaker is a waterproof circuit breaker.

3. The shore power cord as recited in claim 1, wherein the first amperage is greater than the second amperage.

4. The shore power cord as recited in claim 1, wherein the connector plug, connector receptacle, circuit breaker and at least one electrically conductive line are weather resistant.

5. The shore power cord as recited in claim 1, further comprising a plurality of electrically hot lines interconnecting the connector plug and the connector receptacle;
   a separate circuit breaker positioned along each one of the electrically hot lines; and
   wherein electrically hot lines make direct electrical connections from the connector plug to the circuit breakers and from the circuit breakers to the connector receptacle.

6. The shore power cord as recited in claim 1, further comprising a second connector receptacle with an amperage rating connected to the electrical plug through a second electrically hot line;
   a second circuit breaker positioned along the second electrically hot line; and
   wherein the second circuit breaker has an amperage rating that corresponds to the amperage rating of the second connector receptacle, such that if the electrical current at the second connector receptacle exceeds the amperage rating of the second circuit breaker, the second circuit breaker trips.

7. The shore power cord as recited in claim 6, wherein the connector plug, circuit breaker and connector receptacles are disposed in a waterproof housing.

8. The shore power cord as recited in claim 1, wherein the connector plug is rated at 30 amps, and the connector receptacle is rated at 20 amps.

9. The shore power cord as recited in claim 5, wherein the connector plug is rated at 50 amps.

10. The shore power cord as recited in claim 5, wherein one or more of the circuit breakers are rated at 30 amps.

11. The shore power cord as recited in claim 6, wherein the connector plug is rated at 30 amps, and one or both of the first and second connector receptacles are rated at 20 amps.

* * * * *